Aug. 20, 1929.  N. L. OLSON  1,725,015

SPRING SUSPENSION FOR VEHICLES

Filed Aug. 20, 1925

Inventor

Nels L. Olson

By

Attorneys

Patented Aug. 20, 1929.

1,725,015

UNITED STATES PATENT OFFICE.

NELS L. OLSON, OF DETROIT, MICHIGAN.

SPRING SUSPENSION FOR VEHICLES.

Application filed August 20, 1925. Serial No. 51,288.

This invention relates to a spring suspension for vehicles intended for the rear end of a truck or commercial vehicle to provide good resiliency for loads varying within large limits.

My invention aims to furnish the chassis of a vehicle with an extension frame and then support the extension frame, relative to a rear axle assembly, by a novel arrangement of springs, one of which is a light duty spring for sustaining a light load, and the other springs are heavy duty springs brought into action, after the light duty spring has been flexed, to sustain a heavy load.

My invention will be hereinafter specifically described and then claimed, and reference will now be had to the drawing, wherein—

Figure 1:
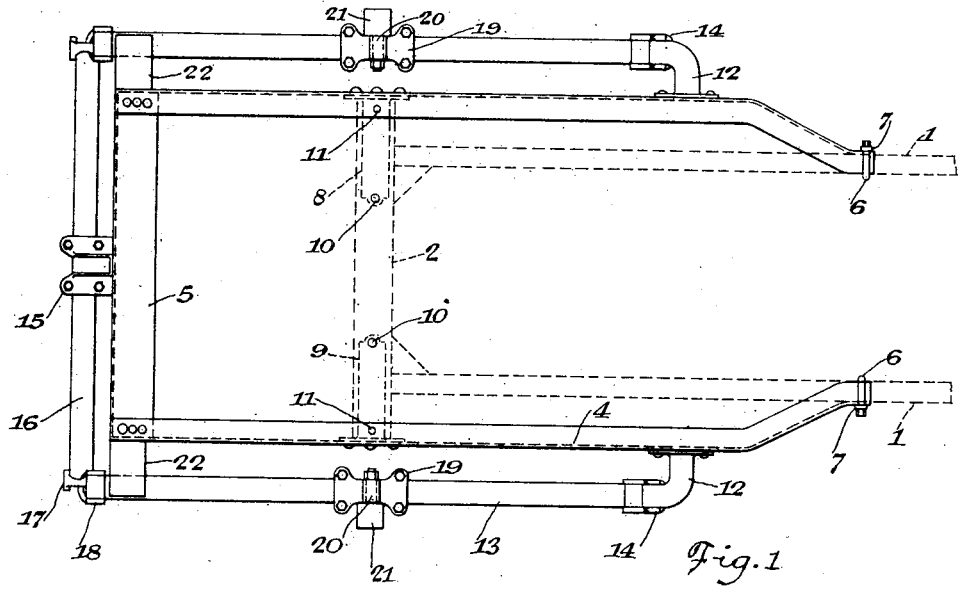
Figure 1 is a plan of a chassis provided with the spring suspension.
Figure 2:
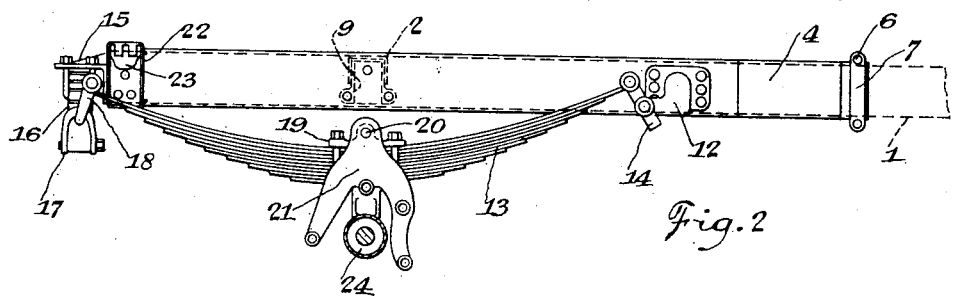
Fig. 2 is a side elevation of the same.
Figure 3:
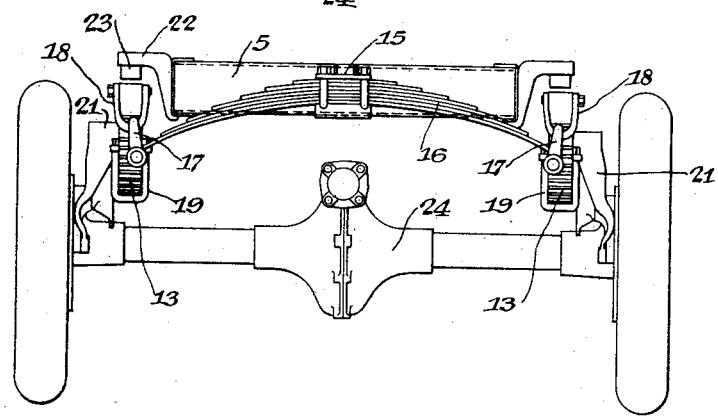
Fig. 3 is a rear end view of a vehicle provided with the spring suspension.

The reference numeral 1 denotes the rear end of a vehicle chassis which is ordinarily supported by a rear axle assembly 24, and to use my spring suspension in connection with this chassis I provide an extension frame, comprising side rails 3 and 4 and a rear member 5. The side rails 3 and 4 are arranged at the outer sides of the chassis frames 1 and the forward ends of the side rails 3 and 4 are inturned to fit on the chassis frames 1 so as to be secured thereto by U-bolt clips 6 and clip plates 7. In addition to this fastening means, brackets 8 and 9 are employed, said brackets being carried by the side rails 3 and 4 intermediate the ends thereof. The brackets 8 and 9 extend into the usual rear member 2 of the chassis frame and are fastened to the rear member 2 by bolts 10 and 11 or the like. The extension frame not only provides more loading space on the usual chassis, but also facilitates installing my spring suspension, because the extension frame and the spring suspension is handled as a unit and has all the necessary connections for mounting it on the chassis frame.

The extension frame, adjacent the inturned forward ends thereof, is provided with hanger brackets 12 for shackles 14, and connected to said shackles are the forward ends of side springs 13, preferably of the semi-elliptical leaf type. These springs have the middle portions thereof provided with spring seats 19 pivotally mounted on pins 20 of yoke castings or brackets 21 attached to the rear axle assembly 24.

The rear ends of the side springs 13 are provided with shackles 18 and 17 supporting the ends of the rear cross spring 16, which has its middle portion supported by a spring seat 15 attached to the rear member 5 of the extension frame. The cross spring 16 is also of the semi-elliptical leaf type, upwardly bowed in contradistinction to the downwardly bowed side springs 13.

As a result of this spring suspension there is a three point yieldable support for the rear end of the extended chassis relative to the rear axle assembly 24, and under light load conditions the side springs 13 remain dormant and the rear cross spring 16 functions to cushion a light load. Some deflection may occur in connection with the side springs, but the rear spring is adapted to absorb all small road shocks and produce smooth riding.

To take care of a heavy load, the rear ends of the side rails 3 and 4 are provided with side brackets 22 which overhang the rear ends of the heavy duty side springs 13. These brackets are provided with resilient bumpers 23, preferably made of rubber, and under no load condition these bumpers are several inches above the rear ends of the side springs, but as the load increases, the bumpers approach the rear ends of the springs 13 and eventually rest thereon, so that the frame is supported mainly from the side springs, with the rear spring stressed and active for light load conditions. As the side springs are heavy enough to carry a maximum load, the proper resiliency is obtained under such condition by the side springs alone.

It is thought that the utility of my invention will be apparent without further description, and while in the drawing there is illustrated a preferred embodiment of my invention, it is to be understood that the structural elements are susceptible to such changes as fall within the scope of the appended claims.

What I claim is:

1. The combination of a chassis, a rear axle assembly, an extension frame attached to said chassis, side springs supported from said rear axle assembly with the forward ends of said springs attached to said extension frame, a spring seat extending rearwardly from said chassis in the same horizontal plane of said chassis, a rear spring having its middle portion in said spring seat and supporting the rear end of said extension frame, said rear spring having its ends connected to the rear ends of said side springs, shackles disposed at a right angle to each other constituting the connection between each end of the rear spring and the ends of the side springs, and bumpers carried by the rear end of said extension frame vertically over points inward of the rear extremities of said side springs and projecting from the sides of said frame or engagement with the rear ends of said side springs, whereby a heavy load will be taken off the rear spring and supported directly on said side springs.

2. The combination of a chassis, a rear axle assembly, an extension frame attached to said chassis, side springs supported from said rear axle assembly with the forward ends of said springs attached to said extension frame, a spring seat extending rearwardly from said chassis in the same horizontal plane of said chassis, a rear spring having its middle portion in said spring seat and supporting the rear end of said extension frame, said rear spring having its ends connected to the rear ends of said side springs, shackles disposed at a right angle to each other constituting the connection between each end of the rear spring and the ends of the side springs, and bumpers of resilient material carried by the rear end of said extension frame and projecting from the sides of said frame for engagement with the rear end of said side springs, whereby a heavy load will be taken off the rear spring and supported directly on said side springs.

In testimony whereof I affix my signature.

NELS L. OLSON.